(12) United States Patent
Tatipamula

(10) Patent No.: US 12,275,435 B2
(45) Date of Patent: Apr. 15, 2025

(54) AUTONOMOUS VEHICLE CONTROL BASED ON CHANGING WEATHER CONDITIONS

(71) Applicant: GM Cruise Holdings LLC, San Francisco, CA (US)

(72) Inventor: Sagar Tatipamula, Mountain View, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 207 days.

(21) Appl. No.: 17/944,598

(22) Filed: Sep. 14, 2022

(65) Prior Publication Data
US 2024/0083465 A1 Mar. 14, 2024

(51) Int. Cl.
*B60W 60/00* (2020.01)

(52) U.S. Cl.
CPC . *B60W 60/00182* (2020.02); *B60W 2510/246* (2013.01); *B60W 2552/40* (2020.02); *B60W 2555/20* (2020.02); *B60W 2710/246* (2013.01)

(58) Field of Classification Search
CPC ..... B60W 60/00182; B60W 2510/246; B60W 2552/40; B60W 2555/20; B60W 2710/246
See application file for complete search history.

(56) References Cited

U.S. PATENT DOCUMENTS

| 2019/0217864 A1* | 7/2019 | Kusukame | B60W 50/0097 |
| 2020/0064839 A1* | 2/2020 | Oyama | B60W 60/00186 |
| 2021/0245627 A1* | 8/2021 | Ferguson | B60W 60/001 |
| 2022/0388545 A1* | 12/2022 | Chae | B60W 60/0015 |

* cited by examiner

*Primary Examiner* — Tyler J Lee
*Assistant Examiner* — Kimia Kohankhaki

(57) ABSTRACT

Aspects of the subject technology relate to systems, methods, and computer-readable media for controlling operation of an autonomous vehicle (AV) based on changing weather conditions. A weather state that is changing in an environment during operation of an AV can be identified based on data gathered by the AV operating in the environment. An extent that the weather state has changed in the environment can be determined from the data gathered by the AV. Operation of the AV can be controlled based on both characteristics of the weather state that is changing and the extent that the weather state has changed.

15 Claims, 6 Drawing Sheets

AUTONOMOUS VEHICLE CONTROL BASED ON CHANGING WEATHER CONDITIONS

BACKGROUND

1. Technical Field

The present disclosure generally relates to controlling an autonomous vehicle (AV) based on changing weather conditions and, more specifically, to controlling an AV based on characteristics of a changing weather condition and an extent that the weather condition has changed.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Inclement weather can pose challenges to various components used in operating an AV. For example, moisture in the air can lead to increased split friction, thereby making it more difficult to safely control the AV. Split friction is an operational condition that is characterized by a significant difference between two or more wheels of a vehicle. In another example, decreasing temperatures can cool a battery providing power to an AV, thereby making it difficult to operate the battery in an efficient manner. However, it can be difficult to control an AV in accounting for changing weather conditions. Specifically, it can be difficult to control an AV based on changing weather conditions while the AV is operating. More specifically, it can be difficult to automatically control operation of an AV to account for changing weather conditions while the AV is operating. For example, as moisture on a road increases, the friction between tires and the road decreases. In turn, this can cause variation in the friction between different tires of a vehicle and the road, leading to a high split friction.

The disclosed technology addresses the problems associated with controlling an AV in inclement weather conditions by facilitating control of the AV based on changing weather conditions while the AV is operating. In particular, the AV can be controlled during operation based on characteristics of a changing weather condition and an extent that the weather condition has changed.

Figure 1:
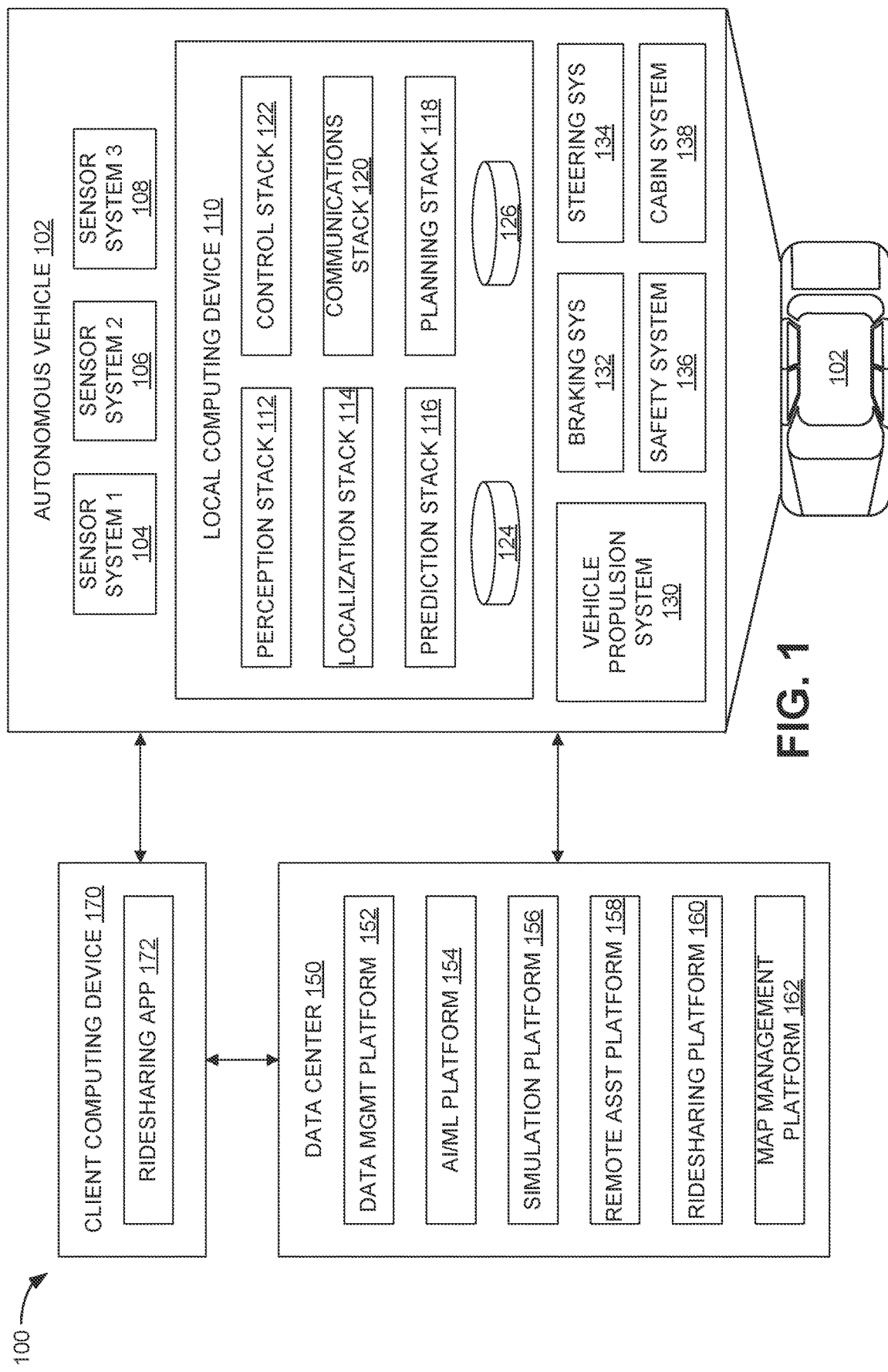
FIG. 1 illustrates an example system environment that can be used to facilitate AV dispatch and operations, according to some examples of the present disclosure.

FIG. 1 is a diagram illustrating an example AV environment 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 1, 104 can be a camera system, the sensor system 2, 106 can be a LIDAR system, and the sensor system 3, 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUS, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below.

Figure 2:
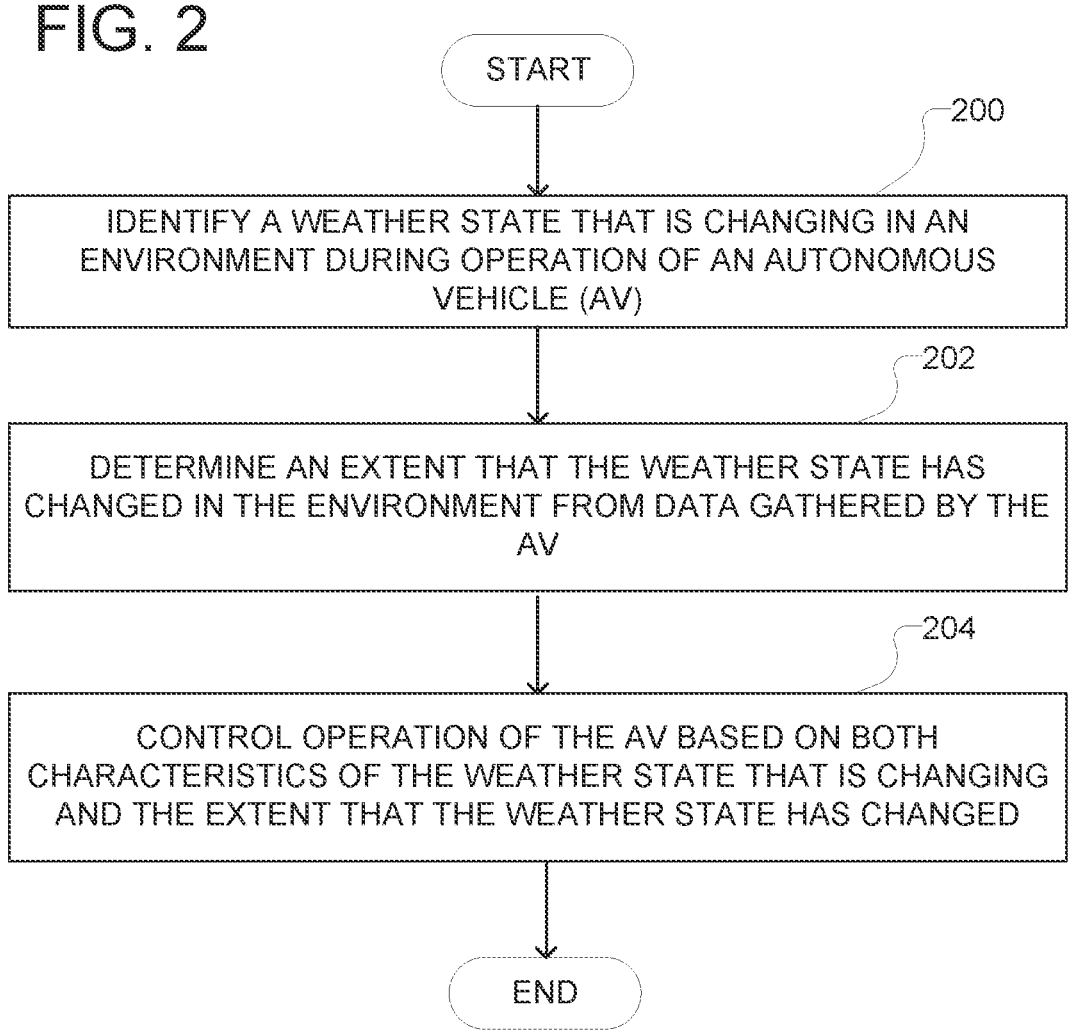
FIG. 2 illustrates a flowchart for an example method of controlling operation of an AV in changing weather conditions.

FIG. 2 illustrates a flowchart for an example method of controlling operation of an AV in changing weather conditions. The method shown in FIG. 2 is provided by way of example, as there are a variety of ways to carry out the method. Additionally, while the example method is illustrated with a particular order of operations, those of ordinary skill in the art will appreciate that FIG. 2 and the modules shown therein can be executed in any order and can include fewer or more modules than illustrated. Each module/block shown in FIG. 2 represents one or more operations, processes, methods or routines in the method.

At operation 200, a weather state that is changing in an environment during operation of an AV is identified. A weather state, as used herein, can include an applicable weather occurrence that is capable of happening in an environment. In particular, a weather state can include an occurrence of inclement weather conditions, e.g., in relation to operation of a vehicle in an environment. Specifically, a weather state can include weather conditions that cause rainy, wet, snowy, or otherwise hazardous road conditions.

The changing weather state can be identified as the AV gathers sensor data related to operation of the AV in the environment. Specifically, the changing weather state can be identified from the sensor data that is gathered by the AV during operation of the AV in the environment. A weather state, as used herein, can include an applicable weather condition that is capable of changing in an environment in which an AV is operating. Specifically, a weather state can include a weather condition that ultimately affects operation of an AV in an environment. For example, a weather state can include air moisture concentrations in an environment, otherwise referred to as humidity levels in the environment, temperature levels in the environment, and wind conditions in the environment. In another example, a weather state can include rain intensity. Rain intensity can be measured through rain proxy computations in a software stack from sensor data gathered by rain and windshield wiper sensors. Measured rain intensity can be combined with identified humidity conditions to estimate hazardous road conditions.

In identifying a weather state that is changing in an environment during operation of the AV, characteristics of the weather state can be identified. Characteristics of a weather state, as used herein, can include applicable features that describe a weather state in an environment, e.g., in relation to other weather states in the environment. For example, characteristics of a weather state can identify the weather state as a changing wind pattern. In another example, characteristics of a weather state can identify the weather state as a changing humidity level.

Further, characteristics of a weather state can describe a weather state in relation to an operational condition of the AV in the environment. An operational condition of an AV, as used herein, can include a condition that is taken into consideration when controlling operation of the AV. For example, an operational condition can include an amount of friction between tires of an AV and a road. In another example, an operational condition can include the obstruction of a field of view ("FOV") of a sensor.

Characteristics of a weather state can be indicative of an operational condition that is ultimately affected by the weather state. For example, characteristics of a weather state can indicate that the weather state is wind speed which can cause push against a vehicle while the vehicle is moving to affect the stability of the vehicle leading to spinouts and crashes. In another example, characteristics of a weather state can indicate that the weather state is air moisture level which ultimately affects friction between the AV and a road leading to spinouts and crahses. In yet another example, characteristics of a weather state can indicate that the weather state is air temperature which ultimately affects temperatures of the AV battery and ultimately performance of the AV when using the battery.

At operation 202, an extent that the weather state has changed in the environment is determined. Specifically, an extent that the weather state has changed in the environment is determined from data gathered by the AV during operation of the AV. An extent of weather change, as determined at operation 202, can be quantified by an applicable amount for describing how much a weather state has changed. Further, the extent of weather change can be quantified either or both temporally and relative to a previous quantification of a weather state. For example, the extent that the weather state has changed can be quantified relative to a time when the AV began operation in a specific environment. In another example, the extent that the weather state has changed can be quantified relative to the last measurement or quantification of the weather state.

The extent that the weather state has changed can ultimately affect an operational condition of the AV. Specifically, a degree or amount that the weather state affects an operational condition of the AV can vary based on the extent that the weather state has changed. For example, a 50% increase in humidity (from 0% to 50%) can ultimately reduce the friction between tires of the AV and the road a specific amount in comparison to a humidity level of 10%. The degree or amount that the weather state affects an operational condition of the AV can be determined through one or more models. In turn, the models can be applied in determining a degree that the changing weather state affects the operational condition of the AV during operation of the AV, e.g., in real time. Real time, as used herein, can include actual time, virtually immediately, or within a threshold range to actual time.

At operation 204, operation of the AV is controlled based on both characteristics of the weather state that is changing and the extent that the weather state has changed. An applicable system that is used in controlling the AV can be operated based on both characteristics of the weather state that is changing and the extent that the weather state has changed. Specifically, a software stack of the AV can be controlled based on both characteristics of the weather state that is changing and the extent that the weather state has changed. For example, software limits that define how the AV is operated can be refined based on the changing weather state. Further, hardware of the AV can be controlled based on both characteristics of the weather state that is changing and the extent that the weather state has changed. For example, sensor cleaning hardware can be activated to clean a sensor based on the changing weather state.

In controlling operation of the AV based on both characteristics of the weather state that is changing and the extent that the weather state has changed a cost function in software for the AV can be adjusted. Specifically, a cost function can be selected based on the characteristics of the weather state that is changing. As follows, the cost function can be adjusted based on the extent of the weather state change. For example, the weather state change can indicate that the AV is encountering inclement weather and the route should be changed. In turn, the cost function for calculating the route can be changed based on the severity of the inclement weather.

An operational condition of the AV in the environment that is affected by the weather state can be identified based on the characteristics of the weather state. Specifically, an operational condition of the AV in the environment can be identified based on the characteristics of the weather state as part of controlling operation of the AV based, at least in part, on the characteristics of the weather state.

For example, a changing weather state can include a changing temperature in the environment. Changing temperature causes the temperature of the battery to change which ultimately affects the efficiency of the battery in operating to provide power to an AV. In turn, battery efficiency can be identified as an operational condition that is affected in response to the changing temperature.

In another example, changing weather states can include decreasing temperature and increasing moisture levels corresponding to rain or snow in the environment. Rain or snow in an operational environment of an AV can stick to a lens of a sensor causing reductions of the sensor FOV. In turn, sensor FOV can be identified as an operational condition that is affected by both changing temperature and moisture levels.

In yet another example, a changing weather state can include changing moisture in the environment. Changing moisture in the environment can cause a wet road which reduces the slip friction/friction between a tire and the road. In turn, this friction can be identified as an operational condition that is affected by changing moisture levels.

Further, an effect of the weather state on the operational condition can be determined as part of controlling operation of the AV based on both characteristics of the weather state and the extent that the weather state has changed. Specifically, an effect of the weather state on the operational condition can be determined based on the extent that the weather state has changed in the environment of the AV. In determining an effect of the weather state on the operational condition based on the extent of the weather state change, external data can be utilized. External data can include applicable information from sources external to the operation of the AV that can be used to determine the effects of changing weather states on operational conditions. Further, one or more models can be applied to determine an effect of the weather state on the operational conditions based on the extent of the weather state.

A model for determining an effect of a changing weather state on an operational condition can map different weather states to different operational conditions that are ultimately affected by the weather states. Further, the model can map a varying extent of a weather state to a varying degree of an effect of the weather state on an operational condition. For example, a model can map changing moisture levels to sensor FOV. Further in the example, the model can map that increasing moisture levels leads to a decreased sensor FOV while decreasing moisture levels corresponds to an increased sensor FOV.

The effect of the weather state on the operational condition can also be determined based on environmental data describing one or more characteristics of the environment in which the AV is operating. Characteristics of an environment, as used here, include applicable characteristics of the environment that affect an operational condition of an AV based on a changing weather state. For example, a characteristic of an environment can include an elevation that an AV is operating at when a temperature drop occurs that ultimately affects a temperature of the AV's battery. In another example, a characteristic of an environment can include whether an AV is operating in direct sunlight when a temperature increase occurs that ultimately affects a temperature of the AV's battery. In yet another example, a characteristic of an environment can include a material of a road/type of road that affects the friction between the tires of the AV and the road in a changing humidity environment.

As follows, operation of the AV can be control based on the determined effect of the weather state on the operational condition. Specifically, if it is determined that the effect of the weather state on the operational condition will ultimately affect the safe driving of the AV, then the operation of the AV can be modified to help the AV maintain safety in the changing weather state. For example, a software stack of the AV can be adjusted to ultimately limit a friction circle associated with the AV during operation based on the effect of the weather state on operation of the AV. Alternatively, if it is determined that the effect of the weather state on the operational condition will not affect the safe driving of the AV, then the operation of the AV can continue without making any changes.

Figure 3:
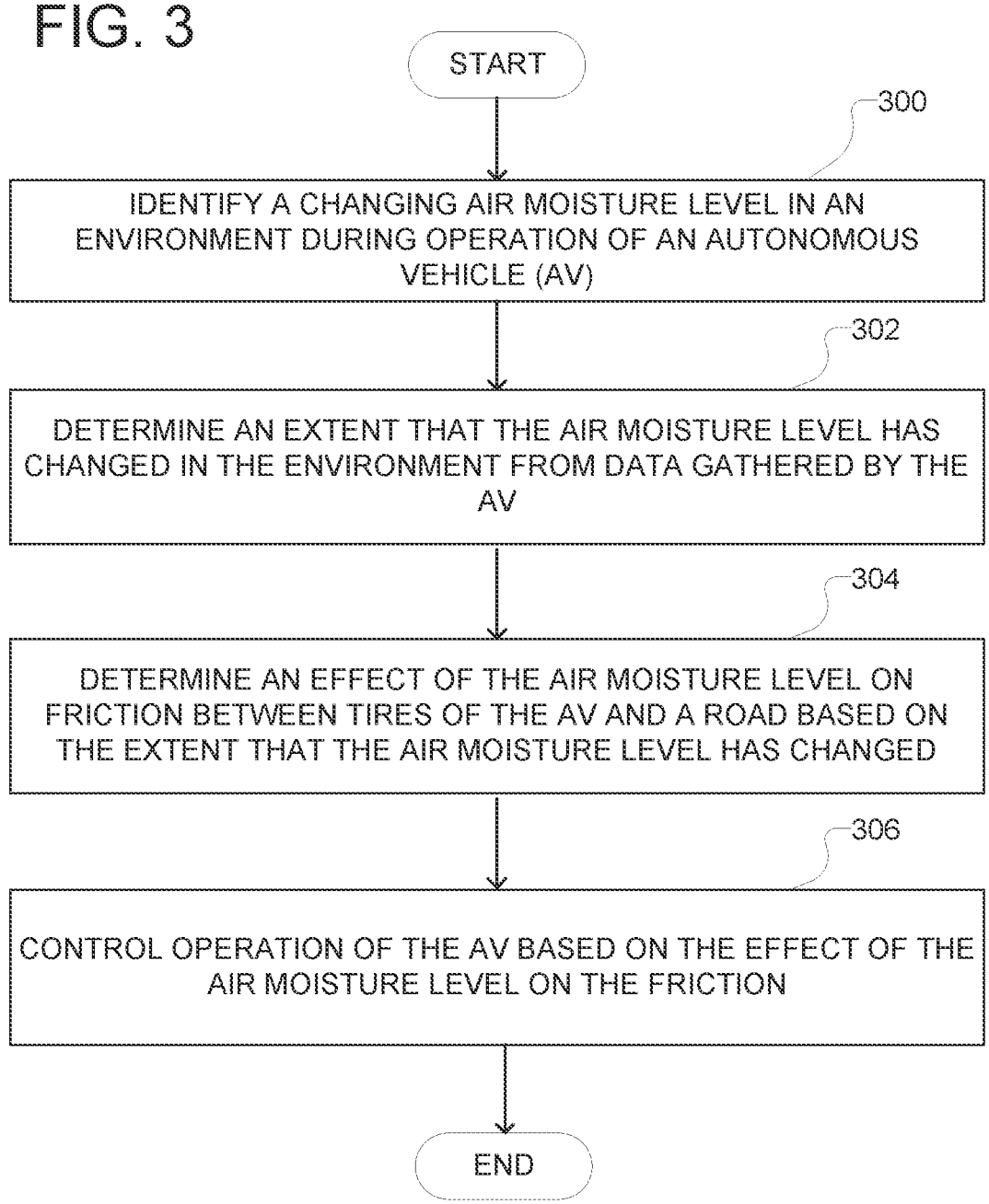
FIG. 3 illustrates a flowchart for an example method of controlling operation of an AV based on an extent that air moisture changes in an environment.

The disclosure now continues with a discussion of controlling operation of an AV based on a changing air moisture level. Specifically, FIG. 3 illustrates a flowchart for an example method of controlling operation of an AV based on an extent that air moisture changes in an environment. The method shown in FIG. 3 is provided by way of example, as there are a variety of ways to carry out the method. Additionally, while the example method is illustrated with a particular order of operations, those of ordinary skill in the art will appreciate that FIG. 3 and the modules shown therein can be executed in any order and can include fewer or more modules than illustrated. Each module shown in FIG. 3 represents one or more operations, processes, methods or routines in the method.

At operation 300, a changing air moisture level is identified in an environment in which an AV is operating. Specifically, a changing air moisture level can be identified in the environment as the AV operates in the environment. More specifically, a changing air moisture level can be identified in the environment based on data gathered by the AV, as the AV is operated in the environment. For example, a moisture sensor and/or a humidity sensor attached to the AV can be used in detecting a changing air moisture level in the environment. A changing air moisture level can and other changing weather states can be identified through an applicable technology. For example, changing weather states can be identified based on camera readings that detect fog, rain, and puddles. In another example, changing weather states can be identified from LIDAR point clouds that detect fog and rain.

At operation 302, an extent that the air moisture level has changed in the environment is determined. Specifically, an extent that the air moisture level has changed in the environment can be determined from the data gathered by the AV. The extent that the air moisture level has changed can be quantified with respect to an applicable temporal measure. For example, the extent that the air moisture level has changed can be quantified every five minutes. Further, the extent that the air moisture level has changed can be quantified with respect to a previous measure of the air moisture level.

At operation 304, an effect of the air moisture level on friction between tires of the AV and a road are determined based on the extent that the air moisture level has changed. The effect of the air moisture level on friction between the tires of the AV and the road can be determined based on friction characteristics of the road. Further, the effect of the air moisture level on friction between the tires of the AV can be determined based on characteristics of the tires. For example, if the tires have worn tread, then the effect of the air moisture level can be determined to have a greater effect on the friction between the tires of the AV and the road than if the tires have full/new treads.

At operation 306, operation of the AV is controlled based on the effect of the air moisture level on the friction. Specifically, operation of the AV can be switched between a first state and a second state based on the effect of the air moisture level on the friction. The first state and the second state can be characterized by operating the AV in different split friction ranges. Specifically, the first state can be a more aggressive driving state suitable for a dry weather state that corresponds to a reduced tire slip range in comparison to a tire slip range of the second driving state. As follows, the second driving sate can be a less aggressive drive state suitable for a wet weather state that corresponds to the increased tire slip range and a lower probability of losing control of the AV.

In controlling operation of the AV based on the effect of the air moisture level on the friction, the route of the AV can be changed. Specifically, the route of the AV can be changed by a routing algorithm that takes into consideration hazardous conditions created through changing air moisture levels. For example, and in response to increasing air moisture and corresponding road moisture, the route of the AV can be modified to remove dangerous left hand turns from the route. Further in the example, the route of the AV can be modified to remove dangerous intersections from the route.

Figure 4:
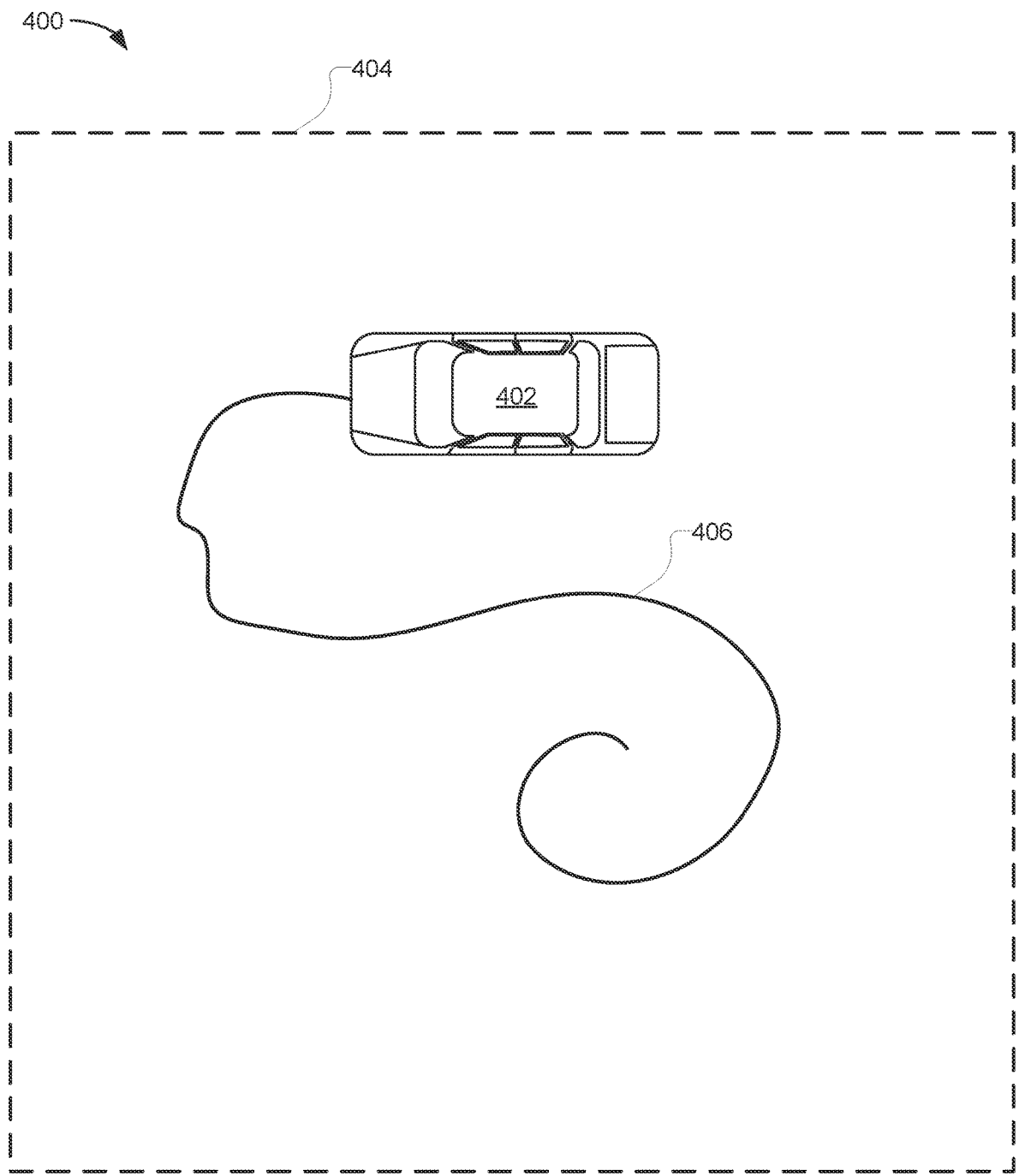
FIG. 4 illustrates an example environment for an AV in identifying an effect of a weather state on an operational condition during operation of the AV.

The disclosure now continues with a further discussion of determining an effect of a changing weather state on an operational condition of an AV based on an extent of the changing weather state. Specifically, FIG. 4 illustrates an example environment 400 for an AV in identifying an effect of a weather state on an operational condition during operation of the AV. The environment 400 includes a designated area 404 in which an AV 402. The designated area 404 can be an area that is isolated from routes that are traversed by AVs. For example, the designated area 404 can be a parking area separate from routes/streets that are used to form routes. Further, the designated area 404 can be an area in which the AV 402 is free to make maneuvers without traffic restrictions.

The AV 402 can operate in the designated area 404 to identify an effect of a changing weather state on an operational condition during operation of the AV. Specifically, the AV 402 can be directed to the designated area 404 and continue to operate in the designated area 404 in response to a changing weather state. In turn, operation of the AV 402 in the designated area 404 can be used to determine the effect of the changing weather state on an operational condition of the AV 402 during the actual operation of the AV 402. Specifically, an extent of the changing weather state on the operational condition can be determined based on operation of the AV 402 in the designated area 404.

As follows, the AV 402 can be controlled based on the effect of the changing weather state on the operational condition of the AV 402. Specifically, the AV 402 can leave the designated area 404 and continue operation, e.g., based on the characteristics of the changing weather state and the extent that the weather state has changed. More specifically, the AV 402 can leave the designated area 404 and continue operation to traverse a route, e.g. on streets.

In operating in the designated area 404, the AV 402 can perform specific maneuvers 406 that can be used in determining an effect of the weather state on the operational condition. In particular, the AV 402 can perform the specific maneuvers 406 to determine an effect of the weather state on the operational condition based on the extent that the weather state has changed in the environment. For example, the AV 402 can perform the specific maneuvers 406 and measure parameters related to friction, such as slip or grip parameters associated with the tires. In particular, the AV 402 can perform the specific maneuvers 406 when applying a certain brake force to determine the parameters associated with the tires. These parameters can then be used in determining a friction level of the road surface in response to the changing weather state. As follows, this can be used to calculate a target friction level to achieve between the tires and the road for safe operation of the AV 402 in the changing weather state.

The maneuvers 406 to perform in the designated area 404 can be selected based on the changing weather state. Specifically, the maneuvers 406 can be selected based on characteristics of the changing weather state. More specifically, the maneuvers 406 can be selected in order to determine an effect of the weather state on an operational condition based on the extent that the weather state has changed in the environment. For example, a turn with a specific brake force can be selected as a maneuver to perform in order to identify an effect of a changing moisture level on the split friction between the AV 402 and the road. In another example, a maneuver can be selected to determine how temperature is affecting battery performance.

Figure 5:
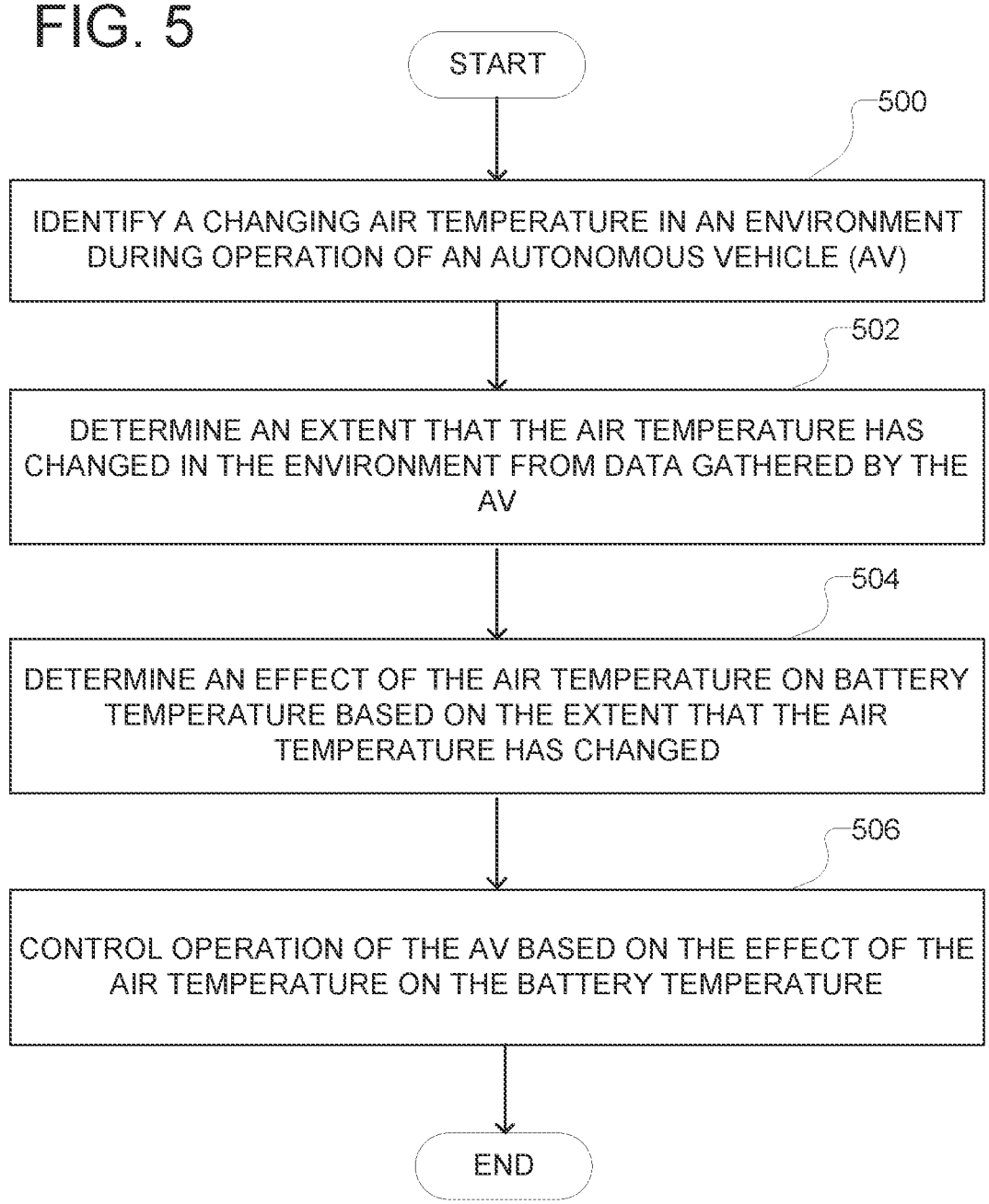
FIG. 5 illustrates a flowchart for an example method of controlling operation of an AV based on an effect of air temperature on battery temperature in an environment.

The disclosure now continues with a discussion of controlling operation of an AV based on a changing air moisture level. Specifically, FIG. 5 illustrates a flowchart for an example method of controlling operation of an AV based on an effect of air temperature on battery temperature in an environment. The method shown in FIG. 5 is provided by way of example, as there are a variety of ways to carry out the method. Additionally, while the example method is illustrated with a particular order of operations, those of ordinary skill in the art will appreciate that FIG. 5 and the modules shown therein can be executed in any order and can include fewer or more modules than illustrated. Each module shown in FIG. 5 represents one or more operations, processes, methods or routines in the method.

At operation 500, a changing air temperature in an environment is identified during operation of an AV. A changing air temperature can be identified from data gathered by sensors of the AV during operation of the AV. At operation 502, an extent that the air temperature is changing in the environment is identified. The extent that the air temperature is changing in the environment can be identified from the data gathered by AV during operation of the AV.

At operation 504, an effect of the air temperature on battery temperature can be determined based on the extent that the air temperature has changed. The battery temperature can include a temperature of the battery at an applicable location of the battery. For example, the battery temperature can include an internal temperature of the battery. In another example, the battery temperature can include a surface temperature of the battery.

At operation 506, operation of the AV is controlled based on the effect of the air temperature on the battery temperature. Specifically, operation of the AV can be controlled to improve performance of the battery or maintain performance of the battery with respect to a previous performance level of the battery. For example, the AV can be operated in order to increase the efficiency of the battery for operating in the changing air temperature environment.

In controlling operation of the AV based on the effect of the air temperature on the battery temperature, energy can be diverted to the battery. Specifically, energy can be diverted to the battery in order to increase or maintain the battery temperature when the air temperature is dropping. Energy can be diverted to the battery form an applicable energy source. For example, energy can be diverted to the battery from onboard computing systems of the AV.

Further, in controlling operation of the AV based on the effect of the air temperature on the battery temperature, the route of the AV and operation of the AV in traversing the route can be controlled. Specifically, the AV can operate at a speed that prevents or limits cooling of the battery from wind as the AV traverses the route. Further, the route can be changed to reduce speeds of the AV for purposes of limiting cooling of the battery.

Figure 6:
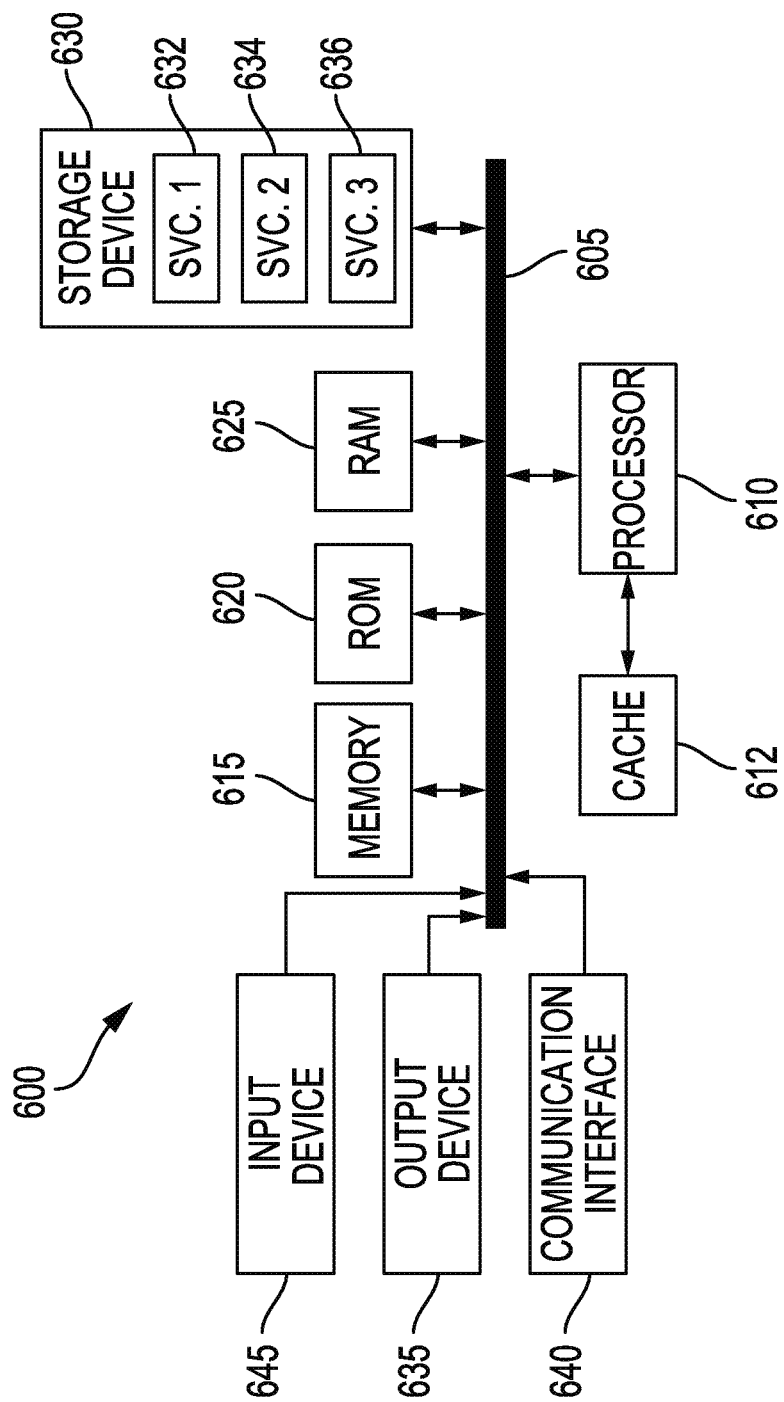
FIG. 6 illustrates an example processor-based system with which some aspects of the subject technology can be implemented, according to some examples of the present disclosure.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAIVI/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing operations of the methods disclosed herein. The particular sequence of such executable instructions or associated data structures represents examples of corresponding acts for implementing the functions described in such operations.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A method comprising: identifying a weather state that is changing in an environment while an autonomous vehicle (AV) is operating in the environment, wherein identification of the weather state change in the environment is based on data gathered by the AV while operating in the environment; determining an extent that the weather state has changed in the environment from the data gathered by the AV; and controlling operation of the AV based on both characteristics of the weather state that is changing and the extent that the weather state has changed.

Aspect 2. The method of Aspect 1, further comprising: identifying an operational condition of the AV in the environment that is affected by the weather state based on the characteristics of the weather state; determining an effect of the weather state on the operational condition based on the extent that the weather state has changed in the environment; and controlling operation of the AV based on the effect of the weather state on the operational condition as part of controlling operation of the AV based on both characteristics of the weather state is changing and the extent that the weather state has changed.

Aspect 3. The method of Aspects 1 and 2, further comprising: determining a plurality of maneuvers to perform in quantifying the effect of the weather condition on the operational condition; performing the plurality of maneuvers in the environment, wherein the environment acts as a test environment for the AV; and determining the effect of the weather state on the operational condition based on performance of the plurality of maneuvers in the test environment.

Aspect 4. The method of Aspects 1 through 3, further comprising determining the effect of the weather state on the operational condition based on environmental data describing one or more characteristics of the environment in which the AV is operating.

Aspect 5. The method of Aspects 1 through 4, wherein the operational condition is a friction between a tire of the AV and a road that the AV is traversing in the environment and the weather state is a moisture level in the environment.

Aspect 6. The method of Aspects 1 through 5, wherein the effect of the weather state on the operational condition is determined based on friction characteristics of the road.

Aspect 7. The method of Aspects 1 through 6, wherein controlling operation of the AV further comprises switching operation of the AV between a first state and a second state based on both the characteristics of the weather state that is changing and the extent that the weather state has changed, wherein the first state is characterized by operating the AV at a first slip friction range and the second state is characterized by operating the AV at a second slip friction range different from the first slip friction range.

Aspect 8. The method of Aspects 1 through 7, wherein the weather state is temperature and the operational condition is a temperature associated with a battery in operation to provide power to the AV.

Aspect 9. The method of Aspects 1 through 8, further comprising controlling diversion of heat generated by computational hardware resources of the AV to the battery.

Aspect 10. A system comprising: one or more processors; and at least one computer-readable storage medium having stored therein instructions which, when executed by the one or more processors, cause the one or more processors to identify a weather state that is changing in an environment while an autonomous vehicle (AV) is operating in the environment, wherein identification of the weather state change in the environment is based on data gathered by the AV while operating in the environment; determine an extent that the weather state has changed in the environment from the data gathered by the AV; and control operation of the AV based on both characteristics of the weather state that is changing and the extent that the weather state has changed.

Aspect 11. The system of Aspect 10, wherein the instructions further cause the one or more processors to: identify an operational condition of the AV in the environment that is affected by the weather state based on the characteristics of the weather state; determine an effect of the weather state on the operational condition based on the extent that the weather state has changed in the environment; and control operation of the AV based on the effect of the weather state on the operational condition as part of controlling operation of the AV based on both characteristics of the weather state is changing and the extent that the weather state has changed.

Aspect 12. The system of Aspects 10 and 11, wherein the instructions further cause the one or more processors to: determine a plurality of maneuvers to perform in quantifying the effect of the weather condition on the operational condition; perform the plurality of maneuvers in the environment, wherein the environment acts as a test environment for the AV; and determine the effect of the weather state on the operational condition based on performance of the plurality of maneuvers in the test environment.

Aspect 13. The system of Aspects 10 through 12, wherein the instructions further cause the one or more processors to determine the effect of the weather state on the operational condition based on environmental data describing one or more characteristics of the environment in which the AV is operating.

Aspect 14. The system of Aspects 10 through 13, wherein the operational condition is a friction between a tire of the AV and a road that the AV is traversing in the environment and the weather state is a moisture level in the environment.

Aspect 15. The system of Aspects 10 through 14, wherein the effect of the weather state on the operational condition is determined based on friction characteristics of the road.

Aspect 16. The system of Aspects 10 through 15, wherein controlling operation of the AV further comprises switching operation of the AV between a first state and a second state based on both the characteristics of the weather state that is changing and the extent that the weather state has changed, wherein the first state is characterized by operating the AV at a first slip friction range and the second state is characterized by operating the AV at a second slip friction range different from the first slip friction range.

Aspect 17. The system of Aspects 10 through 16, wherein the weather state is temperature and the operational condition is a temperature associated with a battery in operation to provide power to the AV.

Aspect 18. The system of Aspects 10 through 17, wherein the instructions further cause the one or more processors to control diversion of heat generated by computational hardware resources of the AV to the battery.

Aspect 19. A non-transitory computer-readable storage medium having stored therein instructions which, when executed by one or more processors, cause the one or more processors to: identify a weather state that is changing in an environment while an autonomous vehicle (AV) is operating in the environment, wherein identification of the weather state change in the environment is based on data gathered by the AV while operating in the environment; determine an extent that the weather state has changed in the environment from the data gathered by the AV; and control operation of the AV based on both characteristics of the weather state that is changing and the extent that the weather state has changed.

Aspect 20. The non-transitory computer-readable storage medium of Aspect 19, wherein the instructions further cause the one or more processors to: identify an operational condition of the AV in the environment that is affected by the weather state based on the characteristics of the weather state; determine an effect of the weather state on the operational condition based on the extent that the weather state has changed in the environment; and control operation of the AV based on the effect of the weather state on the operational condition associated as part of controlling operation of the AV based on both characteristics of the weather state is changing and the extent that the weather state has changed.

Aspect 21. A system comprising means for performing a method according to any of Aspects 1 through 9.

What is claimed is:

1. A method comprising:
   identifying a weather state that is changing in an environment while an autonomous vehicle (AV) is operating in the environment, wherein identification of the weather state change in the environment is based on data gathered by the AV while operating in the environment;
   identifying an operational condition of the AV in the environment that is affected by the weather state based on characteristics of the weather state;
   determining an extent that the weather state has changed in the environment from the data gathered by the AV;
   determining an effect of the weather state on the operational condition based on the extent that the weather state has changed in the environment, including determining a plurality of maneuvers to perform in quantifying the effect of the weather state on the operational condition, performing the plurality of maneuvers in the environment, wherein the environment acts as a test environment for the AV, and determining the effect of the weather state on the operational condition based on performance of the plurality of maneuvers in the test environment; and
   controlling operation of the AV based on the effect of the weather state on the operational condition as part of controlling operation of the AV based on both the characteristics of the weather state that is changing and the extent that the weather state has changed.

2. The method of claim 1, further comprising determining the effect of the weather state on the operational condition based on environmental data describing one or more characteristics of the environment in which the AV is operating.

3. The method of claim 1, wherein the operational condition is a friction between a tire of the AV and a road that the AV is traversing in the environment and the weather state is a moisture level in the environment.

4. The method of claim 3, wherein the effect of the weather state on the operational condition is determined based on friction characteristics of the road.

5. The method of claim 3, wherein controlling operation of the AV further comprises switching operation of the AV between a first state and a second state based on both the characteristics of the weather state that is changing and the extent that the weather state has changed, wherein the first state is characterized by operating the AV at a first slip friction range and the second state is characterized by operating the AV at a second slip friction range different from the first slip friction range.

6. The method of claim 1, wherein the weather state is temperature and the operational condition is a temperature associated with a battery in operation to provide power to the AV.

7. The method of claim 6, further comprising controlling diversion of heat generated by computational hardware resources of the AV to the battery.

8. A system comprising:
one or more processors; and
at least one computer-readable storage medium having stored therein instructions which, when executed by the one or more processors, cause the one or more processors to:
identify a weather state that is changing in an environment while an autonomous vehicle (AV) is operating in the environment, wherein identification of the weather state change in the environment is based on data gathered by the AV while operating in the environment;
identify an operational condition of the AV in the environment that is affected by the weather state based on characteristics of the weather state;
determine an extent that the weather state has changed in the environment from the data gathered by the AV;
determine an effect of the weather state on the operational condition based on the extent that the weather state has changed in the environment, including determining a plurality of maneuvers to perform in quantifying the effect of the weather state on the operational condition, performing the plurality of maneuvers in the environment, wherein the environment acts as a test environment for the AV, and determining the effect of the weather state on the operational condition based on performance of the plurality of maneuvers in the test environment; and
control operation of the AV based on the effect of the weather state on the operational condition as part of controlling operation of the AV based on both characteristics of the weather state that is changing and the extent that the weather state has changed.

9. The system of claim 8, wherein the instructions further cause the one or more processors to determine the effect of the weather state on the operational condition based on environmental data describing one or more characteristics of the environment in which the AV is operating.

10. The system of claim 8, wherein the operational condition is a friction between a tire of the AV and a road that the AV is traversing in the environment and the weather state is a moisture level in the environment.

11. The system of claim 10, wherein the effect of the weather state on the operational condition is determined based on friction characteristics of the road.

12. The system of claim 10, wherein controlling operation of the AV further comprises switching operation of the AV between a first state and a second state based on both the characteristics of the weather state that is changing and the extent that the weather state has changed, wherein the first state is characterized by operating the AV at a first slip friction range and the second state is characterized by operating the AV at a second slip friction range different from the first slip friction range.

13. The system of claim 8, wherein the weather state is temperature and the operational condition is a temperature associated with a battery in operation to provide power to the AV.

14. The system of claim 13, wherein the instructions further cause the one or more processors to control diversion of heat generated by computational hardware resources of the AV to the battery.

15. A non-transitory computer-readable storage medium having stored therein instructions which, when executed by one or more processors, cause the one or more processors to:
identify a weather state that is changing in an environment while an autonomous vehicle (AV) is operating in the environment, wherein identification of the weather state change in the environment is based on data gathered by the AV while operating in the environment;
identify an operational condition of the AV in the environment that is affected by the weather state based on characteristics of the weather state;
determine an extent that the weather state has changed in the environment from the data gathered by the AV;
determine an effect of the weather state on the operational condition based on the extent that the weather state has changed in the environment, including determining a plurality of maneuvers to perform in quantifying the effect of the weather state on the operational condition, performing the plurality of maneuvers in the environment, wherein the environment acts as a test environment for the AV, and determining the effect of the weather state on the operational condition based on performance of the plurality of maneuvers in the test environment; and
control operation of the AV based on the effect of the weather state on the operational condition as part of controlling operation of the AV based on both characteristics of the weather state that is changing and the extent that the weather state has changed.

* * * * *